United States Patent [19]

Henton et al.

[11] 4,125,469

[45] Nov. 14, 1978

[54] BI-DIRECTIONAL FILTER DRIER

[75] Inventors: Paul V. Henton, St. Louis; Roger J. Fait, Manchester, both of Mo.

[73] Assignee: Emerson Electric Co., St. Louis, Mo.

[21] Appl. No.: 806,755

[22] Filed: Jun. 15, 1977

[51] Int. Cl.² .......................................... B01D 29/36
[52] U.S. Cl. .................................................. 210/446
[58] Field of Search ............... 210/420, 446, DIG. 17, 210/418, 428, 435, 447, 455, 456

[56] References Cited

U.S. PATENT DOCUMENTS

| 122,291 | 12/1871 | Taft | 210/420 |
|---|---|---|---|
| 3,289,841 | 12/1966 | Quinting | 210/420 |

Primary Examiner—William A. Cuchlinski, Jr.
Assistant Examiner—Jon Hokanson
Attorney, Agent, or Firm—Polster, Polster and Lucchesi

[57] ABSTRACT

A bi-directional filter drier is provided for reverse flow applications as encountered, for example, in heat pump systems. The filter drier includes a shell defining a chamber, the shell having an inlet and an outlet, preferably axially aligned with one another, which communicate with the chamber. A suitable filter means is positioned in the chamber and a fluid flow path within the chamber is designed so that fluid flow through the filter always occurs in a single direction, regardless of the direction of flow through the inlet and outlet. Flow within the chamber and thus the filter is controlled by a simply constructed valve combination at the inlet and the outlet.

10 Claims, 9 Drawing Figures

BI-DIRECTIONAL FILTER DRIER

BACKGROUND OF THE INVENTION

This invention relates to filter driers and in particular, to a filter drier having utility in heat pump applications. While the invention is described in detail with respect to such filter drier use, those skilled in the art will recognize the broader applicability of the inventive concepts disclosed hereinafter.

Reversed cycle refrigeration systems, more commonly known in the art as heat pumps, have become increasingly popular because of their ability to use existing equipment efficiently for both heating and cooling. The use of filter driers to remove contaminants such as solid particles, water, acid, oil-oxidation products and waste from refrigeration systems is an accepted method of maintaining performance of those systems. Before the widespread use of reverse flow refrigeration systems or heat pumps, fluid flow always has occurred in one direction through the closed loop system. No difficulty is experienced in designing reliable means for trapping the solid contaminants within the body of the filter and keeping them there with single direction flow. However, the reversal of fluid flow required by heat pump systems means that the contaminants are flushed back out of the filter and thus, the filter is only a temporary collector of contaminants.

A number of expedients have been employed for overcoming the problem of reversed flow in heat pump applications, with varying success. One solution was to filter the fluid in one direction of flow only, and to bypass the filter when reversed flow was required. Another solution used in the art is to arrange two filters in parallel with suitable check valves to filter the flow in both directions of flow. While the two filter method is an improvement over the filter bypass method, it does require two filter elements for its implementation. Thus, it intrinsically is expensive in use.

The invention disclosed hereinafter overcomes these prior art difficulties by providing a self-contained valve assembly and filter unit using a single filter element, that element trapping and retaining particulate contaminants regardless of the direction of fluid flow at the input and the output of the filter unit.

Various valving arrangements are known in nonanalogous arts. For example, the U.S. Pat. to Masuda, No. 3,200,255, issued Aug. 10, 1965, discloses an ocean wave electric generator employing a flapper valve arrangement for channeling air through a turbine generator. Our invention is distinguishable from the Masuda disclosure in a number of stuctural areas, although it does utilize a flow direction pattern similar to that disclosed in Masuda.

One of the objects of this invention is to provide a self-contained filter unit that will trap and retain particulate contaminants regardless of the direction of fluid flow into the filter unit.

Another object of this invention is to provide a bi-flow filter unit employing a single filter means in a self-contained enclosure.

Another object of this invention is to provide a low cost filter for heat pump applications.

Yet another object of this invention is to provide a self-contained filter unit in which fluid flow through the filter element is unidirectional although input to the filter unit is bi-directional.

Other objects of this invention will be apparent to those skilled in the art in light of the following description and accompanying drawings.

SUMMARY OF THE INVENTION

In accordance with this invention, generally stated, a filter drier having an input and an output and utilizing a single filter means is provided with an internal valving arrangement that operates to give unidirectional flow through the filter means, regardless of flow direction at the input and the output of the filter drier. In the preferred embodiment, the input and output are arranged axially. A pair of valve assemblies including opposed poppet valves are mounted on opposite ends of a filter means. The valve assembly also includes a plurality of flapper valves which permit fluid flow in one direction and restrict fluid flow in a second direction. Flow from and through the filter is controlled by the respective valve assemblies along each end of the filter.

DESCRIPTION OF THE PREFERRED EMBODIMENT

Figure 1:
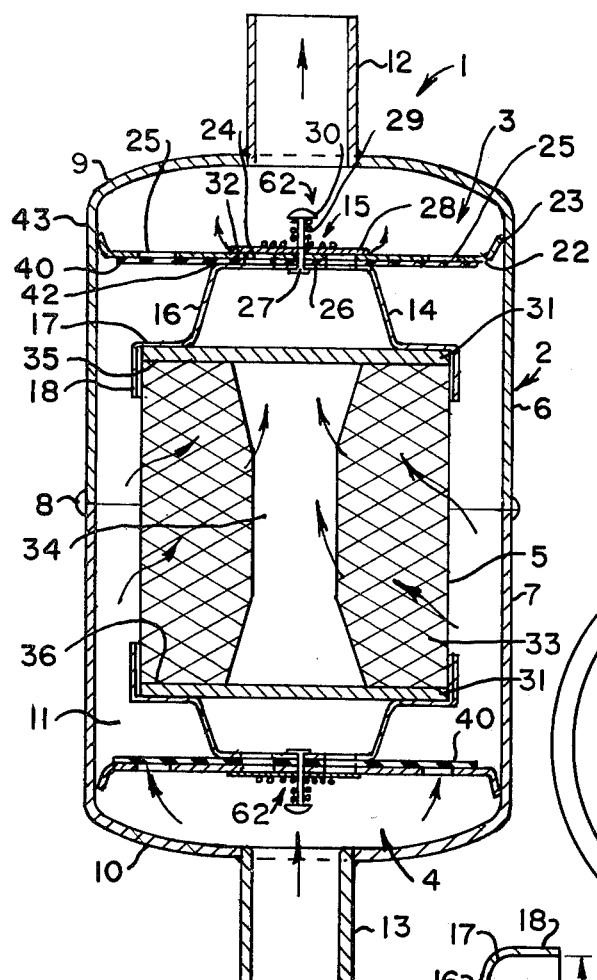
FIG. 1 is a sectional view of one illustrative embodiment of bi-flow filter of this invention.

Referring now to FIG. 1, reference numeral 1 indicates one illustrative embodiment of bi-flow filter of this invention. The filter 1 includes a shell 2, a first valve assembly 3, a second valve assembly 4 and a filter means 5.

The shell 2 generally is an elongated, tubular structure formed from a first section 6 and a second section 7, the sections being joined to one another along a weld 8, for example. Each of the sections 6 and 7 have an end wall 9 and 10, respectively, and when joined, the sections 6 and 7 delimit a chamber 11. The sections 6 and 7 also have a connector 12 and a connector 13 passing through their respective end walls 9 and 10. The connectors 12 and 13 are tubular structures having axial openings in them, the openings communicating with the chamber 11. The connectors 12 and 13 function as inlets and outlets for the filter 1, the inlet or outlet function depending upon the direction of fluid flow through the filter. The connectors 12 and 13 permit installation of the filter 1 in the refrigerant line of a heat pump system, for example.

Figures 2, 3, 4, 5:
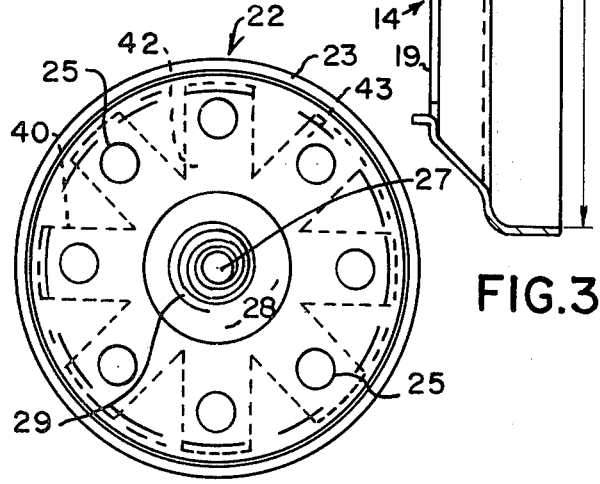
FIG. 2 is a top plan view of the valve assembly used in conjunction with the filter of FIG. 1.
FIG. 3 is a view in side elevation of a centering plate compatible with the valve assembly of FIG. 2.
FIG. 4 is a top plan view of a second valve assembly embodiment compatible with the filter of FIG. 1.
FIG. 5 is a view in side elevation of the filter assembly shown in FIG. 4.

The valve assemblies 3 and 4 are identical, and only a single assembly is described in detail, like numerals being used for like parts, where appropriate. The valve assembly 3 includes a centering plate 14 and a valve means 15. The centering plate 14 generally is a formed structure having a conic side wall 16, which defines an internal shoulder 17 and a lip 18. The centering plate 14 has an open top 19 and preferably has a plurality of tabs 20 formed along the periphery of the open top 19, as is best seen in FIG. 3. The tabs 20 are used to intermount the centering plate 14 and the valve means 15 to provide a unitary assembly. Other interconnection techniques may be used, if desired. The lip 18 defines a mouth 21 which is sized to receive the filter means 5 as later described. Those skilled in the art will recognize that various physical dimensions of the centering plate, and the outline silhouette thereof, may vary in other embodiments of this invention.

Valve means 15 includes a support plate 22 having an outwardly extending flange 23 which abuts and positions the valve means and its associated centering plate 14 within the chamber 11. The plate 23 has at least one generally centrally located opening 24 which is aligned with the open top 19 of the centering plate 14, and a plurality of satellite openings 25 spaced radially outwardly of the opening 24. In the embodiment of FIG. 1, the opening 24 is in fact a pair of openings separated by a bridge 26. A shaft 27 is attached to the bridge 26 by any convenient method. For example, the bridge 26 may have a shaft 27 receiving opening formed in it, the shaft 27 being held in the opening by a press fit or an end flare connection. The shaft 27 has a valve plate 38 of a poppet valve 62 movably mounted to it. The valve plate 28 is free to move on the shaft 27 against the bias of a spring 29. Valve plate 28 is an annular device having a surface 32 sized to cover and seat against the support plate 22, closing the openings 24 in at least one position of the valve plate 28. The spring 29 is mounted between a boss 30 on a first end of the shaft 27 and the plate 28. Spring 29 exerts a relatively light spring force on the plate 28, ensuring complete seating of valve plate 28 against the support plate 22, in the absence of any other forces acting on the valve plate 28.

A flapper means 40 is mounted between the centering plate 14 and the support plate 22. The flapper means 40 generally includes a central hub area 42 having a plurality of arms 43 extending radially outwardly from the hub 42, as is best observed in FIG. 2. As there seen, the flapper means 40 is secured between the plates 14 and 22 along the hub area 42. The arms 43 are sized to cover the openings 25 in the plate 22. Flapper means 40 preferably is constructed from a Teflon coated fiberglass material having a relatively thin cross section. The thinness of the material permits flexing of the arms in one direction of flow, but seats the arms against the openings 25 in the reverse direction of flow. That is to say, fluid flow through the poppet valve 62 tends to close the flapper means 40, while fluid flow past the flapper means 40 tends to close the poppet valve 62 and in particular, tends to force the valve plate 28 against the support plate 22.

A filter pad 31 is inserted against the shoulder 17 of the centering plate 14. The filter pad 31 preferably is constructed from a fiberglass material and traps any large size particles that may be present in the fluid passing through the filter 1.

The filter means 5 generally is a cylindrical structure formed from suitable foraminous material. The filter means 5 is delimited by a body part 33 having a central opening 34 through it. The filter pads 31 are positioned against respective end surfaces 35 and 36 of the body part 33. The pads 31 have a sufficient thickness so that they cushion or spring mount the filter means 5 with respect to the centering plate 14. That is, the pads, in addition to their filtering function, also effectively spring mount the body part 33 against the respective centering plates 14. Consequently, rapid flow through the filter 1 will not cause abrasion of the foraminous material used in the construction of the body part 33.

Operation of the device shown in FIG. 1 is relatively simple to understand. In that Figure, the respective valves of the valve assemblies 3 and 4 are shown in their closed position. As indicated, flow through the filter can occur in either direction. Valve opening depends on the direction of fluid flow. Assuming the connector 12 forms the filter 1 input flow into the connector 12 passes through the openings 25 and past the flapper means 40. The flapper means 40 offers little resistance to flow in the direction described. Flow into the connector 12 also forces the valve plate 28 of the poppet valve 62 against the plate 22, sealing the open top 19 of the centering plate 14 against fluid flow. The fluid flow passes through the openings 25 and past the closed wall portion 16 of the centering plate 14 until it reaches the filter means 5 where it may pass through the filter means 5 to the opening 34. Flow continues through the pad 31 on the end surface 36 of the filter means 5. All flow must pass through the opening 34 in the filter means, as any fluid reaching the valve assembly 4 on the connector 13 side of the filter 1 is restrained by the action of the flapper means 40 positioned on that end. Flow through the filter pad 31 on the end surface 36 of the filter means 5 forces open the poppet valve 62 defined by the valve plate 28 and opening 24, at that end of the filter 1, permitting flow from the filter 1 through the connector 13. When flow through the filter 1 is reversed, the opposite flow arrangement occurs, that flow arrangement being illustrated by the flow lines shown in FIG. 1. It thus is apparent that the filter 1 offers true bi-flow capabilities with simple structure and efficient and economical design.

A variation in the construction of the valve assemblies 3 and 4 is shown in the FIGS. 4 and 5. In general, the structural components of a valve assembly 50 are identical to those described in conjunction with FIG. 1, and like numerals are used where appropriate. The valve assembly 50, however, includes a post 51 attached to the support plate 22. Post 51 has a cantilever beam spring 52 attached to it. The spring 52 is defined by a hub 54 which has a plurality of spokes 53 extending outwardly from it. As shown in the drawings, the spokes 53 are attached to a hub 54 on a first end and have a second free end 55. The length of the spokes 53 is chosen so that the end 55 thereof abuts the valve plate 28 in the assembled condition of the valve assembly 50. The spokes 53 flex as the valve plate 28 moves in response to fluid pressure on the centering plate 14 side of valve assembly. Thus, the spring 52 functions in a manner similar to the spring 29 described in conjunction with the embodiment of FIG. 1, except the spokes 53 ensure uniform movement of the plate 28. That is to say, the spokes 53 prevent the plate 28 from cocking as it moves between closed and opened positions during operational use of the filter 1.

Figure 8:
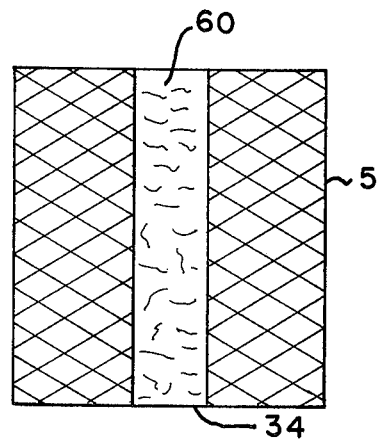
FIG. 8 is a sectional view of a third illustrative embodiment of filter means compatible with the filter of FIG. 1.

Although the opening 34 of the filter means 5 is illustrated as a void in FIG. 1, a filter medium 60 may be inserted within the opening 34 if desired, and such an embodiment is shown in FIG. 8. The filter medium 60 may comprise a variety of materials. A suitable fiberglass plug works well, for example, although steel wool, aluminum wool and various similar filter medium may be employed, for example.

Figure 6:
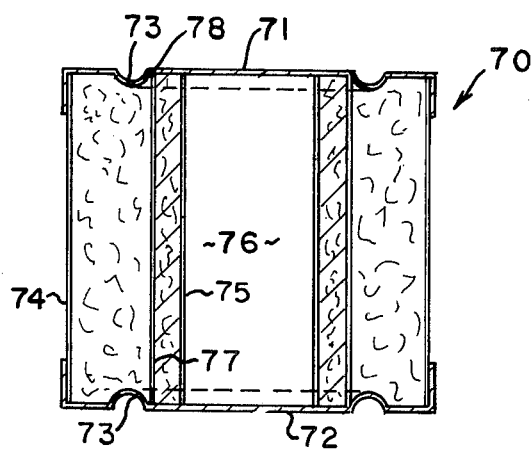
FIG. 6 is a sectional view of a second illustrative embodiment of filter means compatible with the filter of FIG. 1.

A second embodiment of a filter means or assembly, denominated by the reference numeral 70, and compatible with the valve assemblies of FIGS. 1 and 5, is shown in FIG. 6. The filter assembly 70 includes a pair of end caps 71 and 72, respectively. Each of the end caps 71 and 72 has an annular groove 73 formed in it, the purpose of which is described hereinafter. A tubular retainer screen 74 defines an outer wall for the filter assembly 70. A second screen retainer 75 is arranged concentrically with respect to the retainer screen 74 and is spaced inboardly therefrom at some predetermined distance. The retainer screen 75 likewise is a tubular structure. Consequently, the filter assembly 70 has a central opening 76 through it. A small mesh screen 77 is positioned inboard of the screen retainer 75 and abuts a stop 78 formed by the groove 73 on the longitudinally inner side of the caps 71 and 72. The screen retainers 74 and 75 preferably are 19 gauge perforated steel sheet, having a plurality of openings with staggered centers formed in it so that the surface area of the retainer is approximately 32 percent open area. The screen 77 preferably is wire mesh material constructed from 0.0035 diameter wire. The area between the screen 77 and the retainer screen 74 is filled with loose fill material to form a first filter for the filter assembly 70, while the area between the screen 77 and the retainer screen 75 is filled with resin impregnated wool, paper or fiberglass to form a second filter for the filter assembly 70.

The filter assembly 70 functions similar to the filter assembly 5 in that flow is radially inwardly from the retainer screen 74 side of the filter means to the opening 76 therethrough. The end caps 71 and 72 are designed to abut the centering plates 14 of the valve assemblies 3 and 4. As will be appreciated by those skilled in the art, the filter means 5 or 70 and the respective valve assemblies associated with the filter means may be constructed into an integral unit for later insertion within the shell 2.

Figure 7:
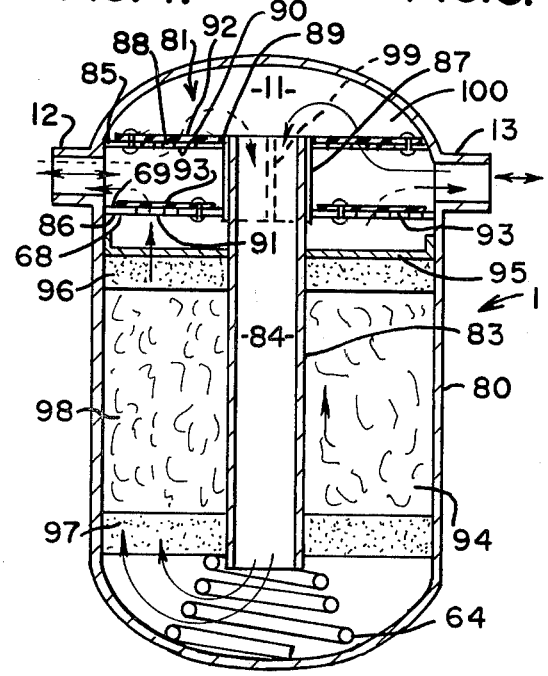
FIG. 7 is a sectional view of a second illustrative embodiment of filter drier of this invention.

The embodiments thus far described employ axial flow generally along the longitudinal axis of the filter means 1 in the operation of the filter. FIG. 7 illustrates an embodiment in which flow is diverted within the filter assembly. As shown in FIG. 7, where like numerals are employed where appropriate, the filter 1 includes a shell 80 having connectors 12 and 13 communicating with the chamber 11 defined by the shell 80. A valve assembly 81 is mounted within the chamber 11. The valve assembly 81 includes a tube 83 extending downwardly from an axis defined by the centerline of the connectors 12 and 13. The tube 83 has a central opening 84 extending through it. A hub 87 is mounted over a first end of the tube 83, while a second end of the tube seats a first end of a conventional coil compression spring 64. The hub 87 has a first plate 85 and a second plate 86 attached to it by any convenient method, the plates being spaced from one another some predetermined distance. The spacing between the plates 85 and 86 generally, but not necessarily, is at least as great as the diameter of the connectors 12 and 13.

The plate 85 has a plurality of openings 88 through it, which extend from and between a surface 89 and a surface 90 of the plate. The plate 86 likewise has a plurality of openings 91 extending from and between a surface 69 and a surface 68 of the plate 86. The openings 88 are closed by a plurality of flapper valves 92 mounted on the surface 89 side of the plate 85. The openings 91 likewise are closed by a plurality of flapper valves 93 mounted along the surface 69 side of the plate 86. The flapper valves again are constructed from a suitable flexible material. A wall 99 extends radially outwardly from the tube 83 on opposite diametric sides of the tube 83, between the plates 85 and 86. Wall 99 prevents fluid from passing directly between the connectors 12 and 13.

A filter means 94 includes a retainer plate 95 mounted over the tube 83 which positions the filter means with respect to the plate 86. The plate 95 is constructed so that fluid may pass from the filter means 94 to the flapper valves 93. A pair of foraminous elements 96 and 97, respectively, are spaced from one another and mounted over the tube 83. The volume between the elements 96 and 97 is filled with a loose fill absorbent material 98. The spring 64 is biased between the shell 80 and the element 97. The spring 64 acts to hold the material 98 in compression, between the elements 96 and 97.

Operation of the filter in the embodiment shown in FIG. 7 is similar to embodiment of FIG. 1 in that flow is bi-directional through the connectors 12 and 13. Thus, fluid flow input at the connector 12 passes through the flapper valve 92 and openings 88 in the plate 85 to the opening 84 of the tube 83. The flapper valve 93 on the connector 12 side of the wall 99 remains closed because of the high pressure fluid present at the connector 12. Likewise, the valve 92 in the plate 85 on the connector 13 side of the wall 99 is closed by the fluid pressure present in a chamber part 100 of the chamber 11, the chamber part 100 being delimited by one end of the shell 80 and the plate 85. The flow proceeds along the tube 83 to the bottom of the shell 80 and then upwardly through the filter means 94. Thereafter, the fluid passes through the openings 91 and flapper valves 93 to the connector 13. Flow in the opposite direction follows a reversed path, the pressure relationships described also being reversed.

Figure 9:
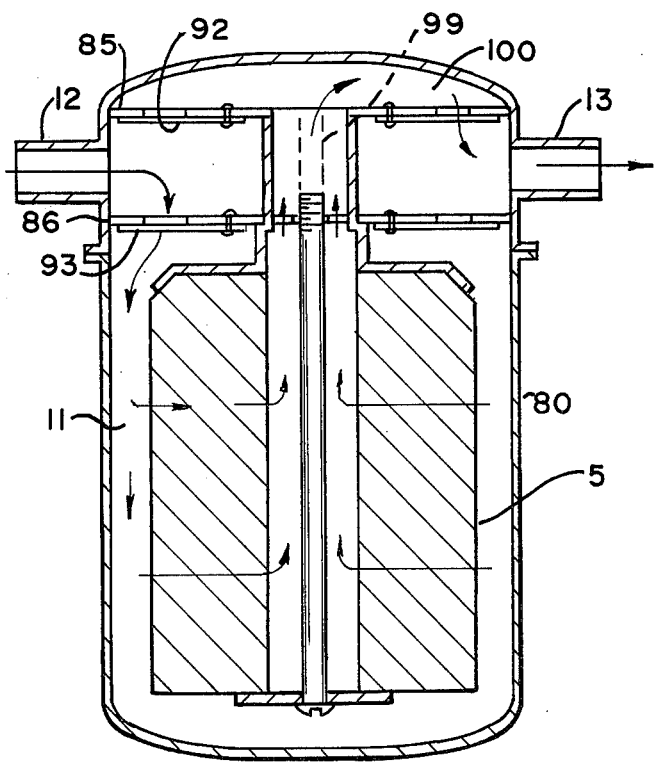
FIG. 9 is a sectional view of a third illustrative embodiment of filter drier of this invention.

Numerous variations, within the scope of the appended claims, will be apparent to those skilled in the art in the light of the foregoing description and accompanying drawings. For example, while two arrangements for providing a bi-directional fluid flow were shown, a number of other valving arrangements will occur to those skilled in the art. For example, the valving arrangement for controlling fluid flow may be constructed separately and interconnected with a conventional drier filter, if desired. The location, relative position and spacing of the valve assemblies may vary in other embodiments of this invention. Likewise, while particular structures, silhouettes and materials were described and shown as preferred, other structures, silhouettes and materials may be substituted for those shown. For example, means for mounting the various plates of the valve assemblies 3 and 4 may vary in other embodiments of this invention. Materials other than fiberglass, steel wool, aluminum wool or loose fill filter material may be employed in place of or in addition to those materials. Additional features may be incorporated in other embodiments of this invention. For example, the T-shape valve design of FIG. 7 may be varied to provide a replaceable filter design with only minor design changes in the structure shown in FIG. 7. Likewise, flow direction internal of the filter enclosure may be varied. Thus, a reversal of the flapper valves location with regard to their respective plates, that is, a movement of the flapper valves from one outboard surface of the plate to the oppositely opposed outboard surface of the plate, and a reduction of the size of the filter means permits fluid flow path alteration as shown in FIG. 9. The filter drier of FIG. 9 generally is similar to the embodiments previously described and consequently, is not described in detail, like reference numerals being utilized, where appropriate. While a poppet valve is shown and described in conjunction with the embodiment of FIG. 1, other valve forms may be utilized, if desired. For example, flapper valves may be used in place of the poppet valves shown in FIG. 1. These variations are merely illustrative.

Having thus described the invention, what is claimed and desired to be secured by Letters Patent is:

1. A bi-flow filter drier, comprising:
   a shell, said shell defining a chamber, said shell including an inlet and an outlet communicating with said chamber;
   a first valve assembly mounted in said chamber, said valve assembly including a centering plate having an opening therethrough, said first valve assembly including a flapper assembly mounted to said centering plate, said flapper assembly including a support plate having a central opening concentric with the opening of said centering plate, valve means closing the central opening of said support plate, said valve means permitting fluid flow in a first axial direction and preventing fluid flow in a second axial direction through the opening of said centering plate, said support plate having a plurality of satellite openings about said central opening, and flapper valve means mounted between said centering plate and said support plate, said flapper valve means permitting flow in an axial direction opposite the direction of flow permitted by said valve means;
   a second valve assembly mounted in said chamber, said second valve assembly including a centering plate having an opening therethrough, said second valve assembly including a flapper assembly mounted to said centering plate, said flapper assembly including a support plate having a central opening concentric with the opening of said centering plate, valve means closing the central opening of said support plate, said valve means permitting fluid flow in the second axial direction and preventing fluid flow in the first axial direction through the opening of said centering plate, said support plate having a plurality of satellite opening about said central opening, and flapper valve means mounted between said centering plate and said support plate, said flapper valve means permitting flow in an axial direction opposite the direction of flow permitting by said last mentioned valve means; and
   filter means mounted between said first and said second valve assemblies, flow passing through said chamber between said inlet and said outlet passing through said filter means in said chamber, said filter being sized and arranged with respect to said first valve assembly, said second valve assembly and said shell so that fluid flow entering one of said valve assemblies passes radially inwardly from said shell through said filter means regardless of the direction of first flow through said inlet and said outlet.

2. The bi-flow filter drier of claim 1 wherein said filter means is a block of foraminous material.

3. The bi-flow filter drier of claim 2 further including first and second pads positioned between said block of foraminous material and said centering plate.

4. The bi-flow filter drier of claim 3 wherein said valve means comprises a poppet valve.

5. The bi-flow filter drier of claim 4 wherein said poppet valve comprises a center post, an annular plate mounted for movement on said center post, and spring means between said center post and said annular plate.

6. The bi-flow filter drier of claim 5 wherein said spring has a central hub mounted to said center post and a plurality of legs extending outwardly from said hub.

7. The bi-flow filter of claim 6 wherein said flapper valve means is constructed from Teflon coated fiberglass.

8. The bi-flow filter drier of claim 7 wherein said filtering means has a central opening in it, and a filter medium in said central opening.

9. The bi-flow filter drier of claim 1 wherein said filter means comprises:
   a first end cap;
   a second end cap spaced from said first end cap;
   a first perforate screen retainer between said first and said second end caps;
   a second screen retainer spaced from and concentric with said first screen retainer;
   a screen means between said first and said second screen retainers; and
   first filter material between said first screen retainer and said screen means.

10. The bi-flow filter drier of claim 9 further including second filter material between said screen means and said second screen retainer.

* * * * *

UNITED STATES PATENT AND TRADEMARK OFFICE
CERTIFICATE OF CORRECTION

PATENT NO. : 4,125,469
DATED : November 14, 1978
INVENTOR(S) : Henton and Fait

It is certified that error appears in the above–identified patent and that said Letters Patent are hereby corrected as shown below:

Column 3, line 30 delete "38" and insert --- 28 ---.

Signed and Sealed this

Eighth Day of May 1979

[SEAL]

Attest:

RUTH C. MASON
Attesting Officer

DONALD W. BANNER
Commissioner of Patents and Trademarks